United States Patent
Oyarzabal et al.

(10) Patent No.: US 8,385,414 B2
(45) Date of Patent: Feb. 26, 2013

(54) MULTIMEDIA SIZE REDUCTION FOR DATABASE OPTIMIZATION

(75) Inventors: Randy E. Oyarzabal, Rochester, MN (US); Crystal F. Springer, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 59 days.

(21) Appl. No.: 12/956,087

(22) Filed: Nov. 30, 2010

(65) Prior Publication Data

US 2012/0136902 A1  May 31, 2012

(51) Int. Cl.
H04N 7/12 (2006.01)
G06F 17/00 (2006.01)
G06F 17/30 (2006.01)
G06F 15/16 (2006.01)
G06F 3/00 (2006.01)

(52) U.S. Cl. ........... 375/240.12; 375/240.24; 707/693; 707/713; 707/715; 715/722; 709/247

(58) Field of Classification Search ......... 707/693–696, 707/713, 715, 821, 824, 912–917; 725/37–43, 725/54; 715/716, 769, 248–249, 722, 723, 715/728, 968; 719/322; 348/608, 642; 375/240.12, 375/240.24; 709/247
See application file for complete search history.

(56) References Cited

U.S. PATENT DOCUMENTS

| | | | |
|---|---|---|---|
| 5,914,679 A * | 6/1999 | Burrows | 341/76 |
| 6,259,733 B1 * | 7/2001 | Kaye et al. | 375/240 |
| 6,539,054 B1 * | 3/2003 | Matsui et al. | 375/240.08 |
| 6,637,031 B1 * | 10/2003 | Chou | 725/87 |
| 6,834,308 B1 * | 12/2004 | Ikezoye et al. | 709/231 |
| 6,970,602 B1 | 11/2005 | Smith et al. | |
| 7,054,911 B1 * | 5/2006 | Lango et al. | 709/213 |
| 7,343,291 B2 * | 3/2008 | Thumpudi et al. | 704/500 |
| 2003/0012279 A1 * | 1/2003 | Chaddha | 375/240.12 |
| 2004/0045030 A1 * | 3/2004 | Reynolds et al. | 725/110 |
| 2004/0208315 A1 * | 10/2004 | Kilbank | 380/37 |
| 2004/0225743 A1 * | 11/2004 | Huggins et al. | 709/231 |
| 2005/0035886 A1 * | 2/2005 | Labelle | 341/51 |
| 2005/0265697 A1 * | 12/2005 | Wang et al. | 386/96 |
| 2006/0050970 A1 * | 3/2006 | Gunatilake | 382/232 |

(Continued)

FOREIGN PATENT DOCUMENTS

EP     1594319 A1     11/2005
WO    WO 00/48400    *  8/2000

(Continued)

OTHER PUBLICATIONS

M. Ezhilarasan et al. "A new entropy encoding technique for multimedia data compression", International Conference on Computational Intelligence and Multimedia Applications 2007, pp. 157-161.*

Primary Examiner — Srirama Channavajjala
(74) Attorney, Agent, or Firm — Patterson & Sheridan LLP

(57) ABSTRACT

Optimizing data in a data store. A request including a number of optimization parameters is received, where the optimization parameters specify characteristics of media content to be optimized. Responsive to the request, the media content (e.g., audio content, video content and images) may be encoded to reduce a storage size of the media content. Such a determination may be made based on one or more attributes of the media content, as well as the optimization parameters included in the request.

16 Claims, 7 Drawing Sheets

U.S. PATENT DOCUMENTS

| | | |
|---|---|---|
| 2007/0022216 A1 | 1/2007 | Benari et al. |
| 2007/0179979 A1* | 8/2007 | Folgner et al. ............. 707/104.1 |
| 2007/0220024 A1* | 9/2007 | Putterman et al. ............ 707/101 |
| 2007/0276984 A1* | 11/2007 | Schuessler .................... 711/100 |
| 2008/0056354 A1* | 3/2008 | Sun et al. ................. 375/240.12 |
| 2008/0189591 A1* | 8/2008 | Lection ......................... 715/202 |
| 2008/0207182 A1* | 8/2008 | Maharajh et al. .......... 455/414.1 |
| 2008/0231480 A1* | 9/2008 | Lai et al. ......................... 341/51 |
| 2009/0119322 A1* | 5/2009 | Mills et al. .................... 707/101 |
| 2010/0107104 A1 | 4/2010 | Bruce et al. |
| 2010/0332981 A1* | 12/2010 | Lipton et al. .................. 715/716 |
| 2011/0126104 A1* | 5/2011 | Woods et al. ................. 715/719 |

FOREIGN PATENT DOCUMENTS

| | | | |
|---|---|---|---|
| WO | WO 2004052002 | * | 6/2004 |
| WO | WO 2005/074143 | * | 8/2005 |
| WO | WO 2009/073823 | * | 6/2009 |

* cited by examiner

PROCESS INFORMATION

IDENTIFIER/NAME
SAMPLE IMAGE SWEEP

OPERATION(AGENT)
DOCUMENT GRAPHIC(S) CONVERSION

SOURCE
UVATS STRAT. DIR.

ENABLE NOTIFICATIONS? ● YES ○ NO

NOTIFICATION LIST
RANDY OYARZABAL/
ROCHESTER/IBM@IBMUS

OPTIONS
☑ LOGGING
☐ REUSE
☐ REUSE (DOC SIZE)
☐ TEST RUN
☐ DEBUG
☑ RUN ON SERVER
☐ USE LOCAL REPLICA(S)

LOG OPTIONS
○ HIGH
● MEDIUM
○ LOW

SCHEDULE INTERVAL
● IDLE        ○ HOURLY
○ 5 MIN.     ○ DAILY
○ 10 MIN.    ○ WEEKLY
○ 15 MIN.    ○ MONTHLY
○ 30 MIN.

OPTIMIZATION PARAMETER (SELECT PREVIOUSLY USED QUERY)
RECORDS > 300MB

COMMENTS/DESCRIPTION
OPERATE ON RECORDS THAT ARE > 300MB

*FIG. 6A*

MULTIMEDIA SIZE REDUCTION FOR DATABASE OPTIMIZATION

BACKGROUND

Embodiments of the invention relate to database optimization, and more particularly, to techniques for optimizing multimedia content contained in a database.

Digital multimedia content is becoming increasingly widespread, in large part due to the growth and popularity of personal computers. Additionally, a plethora of other devices are also capable of retrieving and presenting digital multimedia content. For example, many modern media players and smartphones are capable of retrieving and presenting images, audio content and even video content. As the popularity of digital multimedia content increases, the storage demands for maintaining such content also increase. Accordingly, many content providers and content repositories have begun using multimedia databases for storing large amounts of multimedia content. However, although modern databases are adept at managing large amounts of information, there still is often a performance impact on the database as the amount of information stored grows in size. Additionally, storage concerns may still be an issue for multimedia databases containing large amounts of data.

SUMMARY

Embodiments of the invention provide a method, product and system for optimizing data in a data store. The method, product and system include receiving a request containing one or more optimization parameters and one or more selection criteria. In such a request, the optimization parameters specify characteristics of media content to be optimized, and the selection criteria specify types of media content to process. Responsive to the request, the method, product and system include identifying a plurality of media content contained in the data store based on the one or more selection criteria. Additionally, the method, product and system include, for each identified media content in the plurality of media content, determining whether to optimize the media content, based on one or more attributes of the media content and the one or more optimization parameters, and upon determining to optimize the media content, encoding the media content in a media format to reduce a storage size of the media content.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 6A-6B are screenshots illustrating an exemplary configuration pages for the media optimization component, according to embodiments of the present invention.

DETAILED DESCRIPTION

Figure 1:
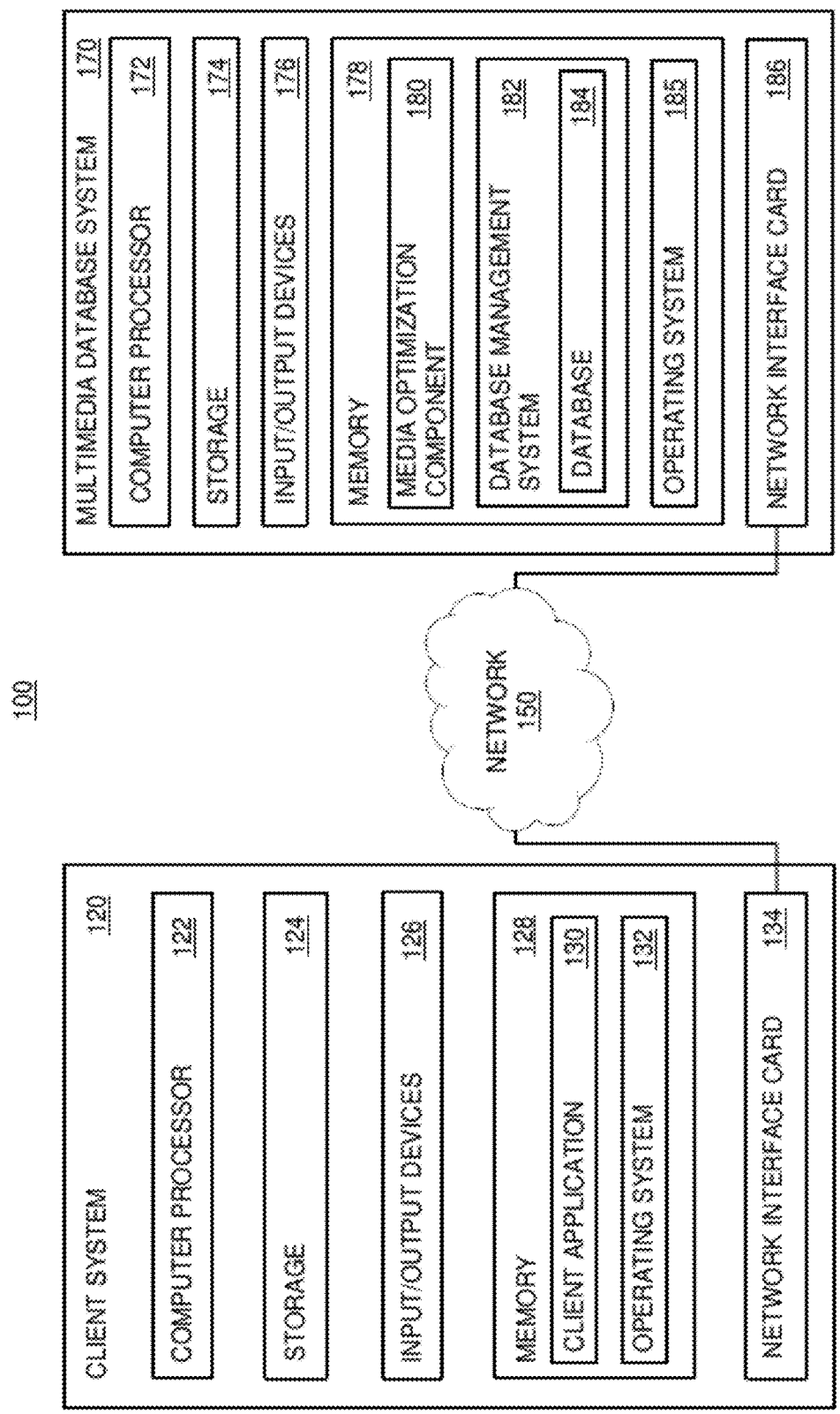
FIG. 1 is a block diagram of components of a computer system configured to run a media optimization component, according to one embodiment of the present invention.

Embodiments of the invention provide techniques for optimizing a database containing multimedia content using a media optimization component. Embodiments may receive a request including one or more optimization parameters which specify characteristics of media content to be optimized. Embodiments may scan a multimedia database to identify a plurality of media content. Exemplary media content may include, without limitation, audio files, video files, and images. Once the plurality of media content in the multimedia database is identified, embodiments may determine whether to optimize each instance of identified media content in the plurality of media content. Such a determination may be based on the one or more optimization parameters included in the request, as well as attributes of the media content itself. Embodiments may then optimize each of the determined instances of media content to reduce a storage size of the media content. In one embodiment, such optimization includes converting the media content from a first format to a second format. In a second embodiment, where the media content is encoded at a first encoding rate, the optimization includes encoding the media content at a second, lower encoding rate relative to the first encoding rate. In an alternate embodiment, where the media content is encoded at a first resolution, the optimization includes encoding the media at a lower resolution relative to the first resolution.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access media content (e.g., media content contained in a database) or related data available in the cloud. For example, a database management system could execute on a computing system in the cloud and receive requests to retrieve and store media content in a database. In such a case, a media optimization component may optimize the media content contained in the database, and may store the optimized content in the database at a storage location in the cloud. Doing so allows a user to access the optimized media content from any computing system attached to a network connected to the cloud (e.g., the Internet).

Referring now to FIG. 1, FIG. 1 is a block diagram of components of a computer system configured to run a media optimization component, according to one embodiment of the present invention. As shown, the system 100 contains a client system 120 and a multimedia database system 170. The client system 120 contains a computer processor 122, storage media 124, I/O devices 126, a memory 128 and a network interface 134. Computer processor 122 may be any processor capable of performing the functions described herein. The client system 120 may connect to the network 150 using the network interface 134. Furthermore, as will be understood by one of ordinary skill in the art, any computer system capable of performing the functions described herein may be used.

In the pictured embodiment, memory 128 contains a client application 130 and an operating system 132. Although memory 128 is shown as a single entity, memory 128 may include one or more memory devices having blocks of memory associated with physical addresses, such as random access memory (RAM), read only memory (ROM), flash memory or other types of volatile and/or non-volatile memory. The client application 130 is generally capable of generating database queries. Once the client application 130 generates a query, the query may be submitted to a DBMS (e.g., DBMS 182) for execution over the network 150. The operating system 132 may be any operating system capable of performing the functions described herein.

The multimedia database system 170 contains a computer processor 172, storage media 174, memory 178 and a network interface 186. Computer processor 172 may be any processor capable of performing the functions described herein. The multimedia database system 170 may connect to the network 150 using the network interface 186. Furthermore, as will be understood by one of ordinary skill in the art, any computer system capable of performing the functions described herein may be used.

In the pictured embodiment, memory 178 contains a media optimization component 180, a DBMS 182 and an operating system 185. Although memory 178 is shown as a single entity, memory 178 may include one or more memory devices having blocks of memory associated with physical addresses, such as random access memory (RAM), read only memory (ROM), flash memory or other types of volatile and/or non-volatile memory. The DBMS 182 contains a database 184. The database 184 may contain one or more instance of multimedia content. As discussed above, examples of such multimedia content may include, but are not limited to, images, audio content, and video content. The operating system 185 may be any operating system capable of performing the functions described herein.

Generally, the client application 130 may generate and submit requests to the DBMS 182 using the network 150. For example, one exemplary query may include a request including multimedia content to be stored in the database 184. In such an example, the request may include media content that has not yet been optimized, and as such, may require more storage space to store. For example, the DBMS 182 may receive a particular audio file that is encoded in an inefficient audio format, such as a raw audio format (e.g., a .WAV file). As such, when the audio file is stored in the database 184, it may require a large amount of storage space. Furthermore, in many cases where the audio file is not required to be encoded in a raw audio format (or even in a lossless format), such additional storage space may be wasted on storing the larger file. Additionally, when dealing with numerous multimedia files stored in the database 184, the additional I/O throughput (e.g., reading from and writing to storage) required to process these inefficient multimedia files may degrade the performance of the DBMS 182 and the multimedia database system 170 itself.

Accordingly, in such an example, the media optimization component 180 may identify the received audio file as un-optimized media content, and may determine that the audio file may be further optimized so as to reduce the storage size of the audio file. In one embodiment, the media optimization component 180 may identify a class of the media content to determine whether to optimize the media content. For example, if the audio file belongs to a class of "Personal Documents," which encompasses personal content stored in the database, the media optimization component 180 may determine that the audio file may be converted into a more efficient audio format. That is, because the "Personal Documents" class may be more likely to contain non-critical content, the media optimization component 180 may determine some amount of loss in the encoding of the content is acceptable. As a second example, if the audio file belongs to a class of "Patient Data," which encompasses data relating to a particular patient in a medical care facility, the media optimization component 180 may determine that the audio file may not be further optimized. That is, because the "Patient Data" class may contain critical content such as test result data relating to one or more medical tests performed for the patient, the media optimization component 180 may determine that no amount of loss is acceptable in encoding such content. Of course, such an example is without limitation and for illustrative purposes. Furthermore, one of ordinary skill in the art will quickly recognize that any number of classes and other factors may be used in determining whether and how to optimize media content.

In addition to analyzing the class of the media content, the media optimization component 180 may also look at a priority level associated with the media content. For instance, in an embodiment where priority 1 is the highest priority and priority 5 is the lowest priority, the media optimization component 180 may be configured to only optimize content that has a priority greater than 1. By doing this, users may designate certain media content as high priority in order to indicate that such content should not be optimized by the media optimization component 180. This may be advantageous, for example, if a user has an audio file that needs to be kept in a lossless format. In such an example, the user may designate the audio file as priority 1, in which case the media optimization component 180 will not convert the audio file into a more efficient format. Other factors the media optimization component 180 may analyze to determine whether to optimize media content include, without limitation, the storage size of the media content, the encoding rate of the media content, the encoding format of the media content, and the resolution of the media content. Additionally, the media optimization component 180 may be configured to look at various combinations of these and other factors when determining whether particular media content should be optimized.

Upon determining that the media content should be optimized, the media optimization component 180 may optimize the media content. In one embodiment, the media optimization component 180 may convert the media content from a first encoding format to an alternate encoding format. For instance, continuing the above example, the media optimization component 180 may convert the raw audio file to a compressed audio format. In another embodiment, the media optimization component 180 may optimize the media content by encoding the media content at a lower encoding rate. The optimized media content may then be stored in the database 184 in place of the original, un-optimized media content. Advantageously, by doing this, embodiments of the invention may reduce the amount of storage space required to store the media content. Additionally, by reducing the amount of data stored by the database, embodiments may further improve the performance of the DBMS 182.

Although the current example involves optimization of a media file at the time the media file is inserted into the database 184, such a depiction represents only one embodiment of the invention. In a second embodiment, the media optimization component 180 may process all the multimedia content in the database 184 as a batch job. A user may schedule the batch job to run at a certain time, and may further schedule the batch job as either a one-time occurrence or a periodic event. In such an embodiment, the media optimization component 180 may first scan the database 184 to identify the media content stored within the database 184. The media optimization component 180 may then analyze each instance of media content to determine whether the media content should be optimized and if so, how the media content should be optimized. By performing such an operation as a batch job, embodiments enable the database optimization to be scheduled at an off-peak time, thereby minimizing the effect of such processing on the multimedia database system 170. Furthermore, such an embodiment allows existing multimedia databases to be optimized, thus expanding the range of data stores that embodiments may optimized.

Figure 2:
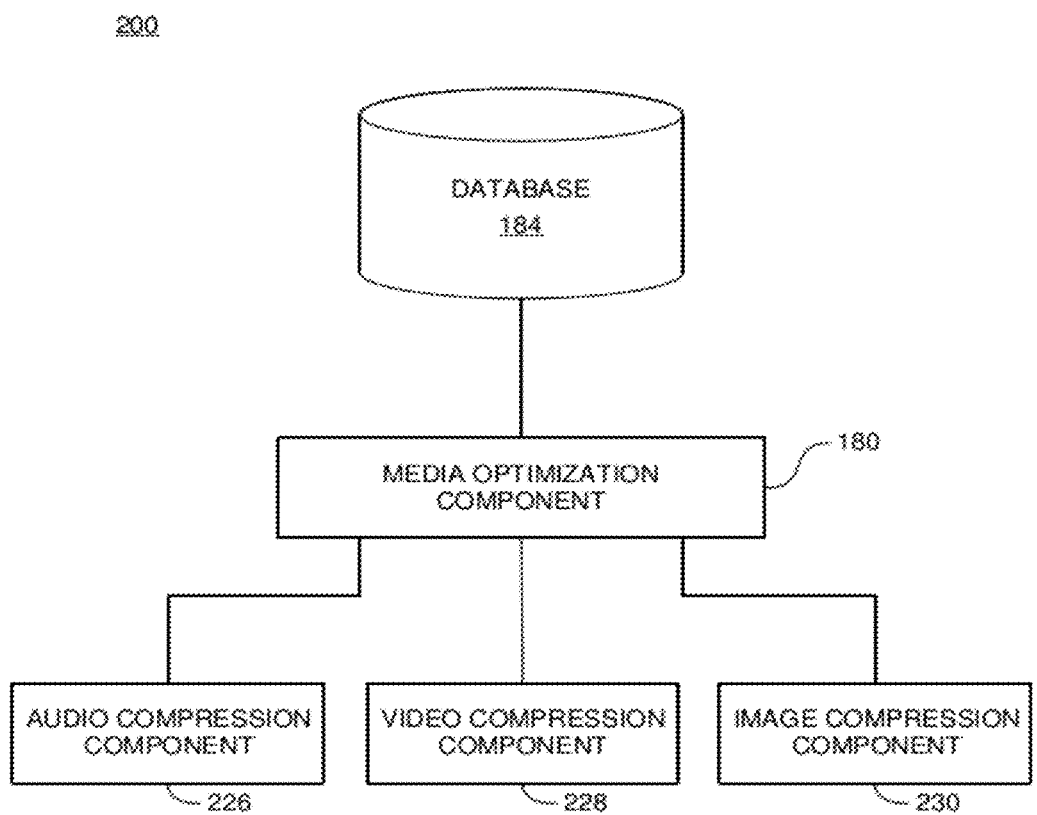
FIG. 2 is a diagram illustrating a configuration for a media optimization component, according to one embodiment of the present invention.

FIG. 2 is a diagram illustrating a configuration for a media optimization component, according to one embodiment of the present invention. As shown, the system 200 contains a database 184 communicatively coupled to the media optimization component 180. In one embodiment, the media optimization component 180 and the database 184 reside on the same computer system (e.g., multimedia database system 170). In another embodiment, the media optimization component 180 and the database 184 are communicatively coupled via a network 150.

Additionally, the media optimization component 180 is shown as communicatively coupled to an audio compression component 226, a video compression component 228, and an image compression component 230. Generally, the components 226, 228 and 230 may reside on any computer system(s) capable of communicating with the media optimization component 180. Moreover, the components 226, 228 and 230 may generally be configured to process media files of their respective types. For instance, the audio compression component 226 may decode and encode audio files. Accordingly, when the media optimization component 180 determines that a particular media file should be optimized, the media optimization component 180 may route the media file to the appropriate component 226, 228, 230 for optimization. For instance, upon determining an exemplary video file may be optimized, the media optimization component 180 may send the exemplary video file to the video compression component 228 for optimization.

Figure 3:
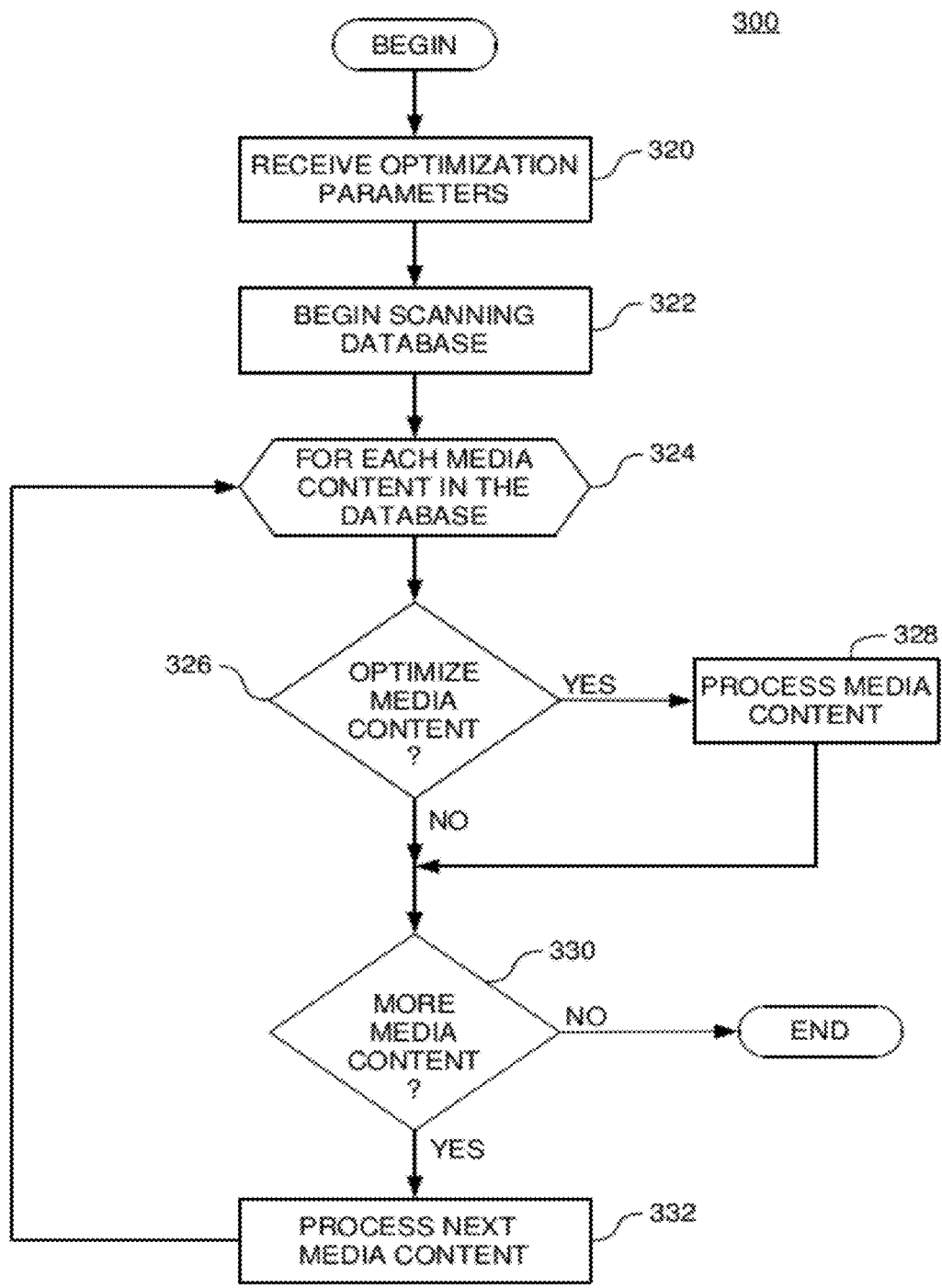
FIG. 3 is a flow diagram illustrating a method for optimizing media content in a database, according to one embodiment of the present invention.

FIG. 3 is a flow diagram illustrating a method for optimizing media content in a database, according to one embodiment of the present invention. As shown, the method 300 begins at step 320, where the media optimization component 180 receives optimization parameters (step 320). The optimization parameters generally specify characteristics of media content to be optimized. For instance, one example of an optimization parameter is a threshold encoding rate, which specifies a maximum allowed encoding rate for media content in the database. If the media optimization component 180 identifies media content (e.g., an audio file) in the database with an encoding rate above the threshold encoding rate, the media optimization component 180 may optimize the identified media file (e.g., by sending the audio file to the audio compression component 226 to be encoded at a lower encoding rate).

As a second example, another exemplary optimization parameter is a threshold resolution, which specifies a maximum allowed resolution for media content. As such, if the media optimization component 180 then identifies media content (e.g., an image) with a higher resolution, the media optimization component 180 may optimize the media content to reduce its resolution to an allowable level. Other examples of optimization parameters include, without limitation, a threshold storage size for the media content, one or more disallowed media formats, a priority level for media content to be optimized, and a class of media content to be optimized. Of course, such examples are for illustrative purposes only, and one of ordinary skill in the art will quickly recognize that other factors may be considered in lieu of or in addition to the above optimization parameters.

Upon receiving the optimization parameters, the media optimization component 180 begins scanning a database for media content (step 322). The method 300 then enters a loop at step 324-332, where for each instance of media content in the database, the media optimization component 180 determines whether to optimize the media content (step 326). In one embodiment, the media optimization component 180 bases this decision on attributes of the media content and the received optimization parameters. For example, assume one of the receive optimization parameters specifies that the .WAV format is a disallowed media format for audio files in the database. In such an example, the media optimization component 180 may identify a particular audio file stored in the database in a .WAV format, and accordingly may determine that the audio file should be optimized.

If the media optimization component 180 determines to optimize the media content, the media optimization component 180 optimizes the media content (step 328). As discussed earlier, in one embodiment, the media optimization component 180 accomplishes this by sending the media content to the appropriate compression component 226, 228, 230. Continuing the above example of an audio file stored in the .WAV format, the media optimization component 180 may optimize such a file by converting the audio file to another acceptable media format. In one embodiment, the media optimization component 180 is preconfigured to always optimize media content having a disallowed format by converting the media content to a particular acceptable format.

In another embodiment, the media optimization component 180 may be configured to determine an appropriate format for the media content. For example, if the media optimization component 180 determines an audio file is currently stored as the disallowed media format of .WAV, the media optimization component 180 may analyze attributes of the media content to determine an appropriate encoding format for the media content. For instance, in one embodiment, the media optimization component 180 looks to a priority level associated with the media content to determine the appropriate encoding format. Continuing the example, if the media optimization component 180 determines the media content belongs to a first class containing critical data (e.g., patient test data), the media optimization component 180 may determine that the media content should be encoded in a lossless compression format. As a second example, if instead the media optimization component 180 determines the media content belongs to a second class containing low priority, non-critical data (e.g., personal documents such as voice recordings), the media optimization component 180 may determine that the media content may be further compressed and encoded in a lossy compression format. Of course, the above examples are included herein merely for illustrative purposes, and are without limitation.

If instead the media optimization component 180 determines not to optimize the media content, the media optimization component 180 determines whether the database contains more media content to process (step 330). As an example, the media optimization component 180 may determine not to optimize a particular instance of media content when the media content is already optimized under the optimization parameters. Upon determines the database does contain unprocessed media content, the media optimization component 180 then processes the next media content in the database (step 332), and the method returns to step 326. On the other hand, if the media optimization component 180 determines there are no more instances of media content in the database to process, the method 300 ends.

Figure 4:
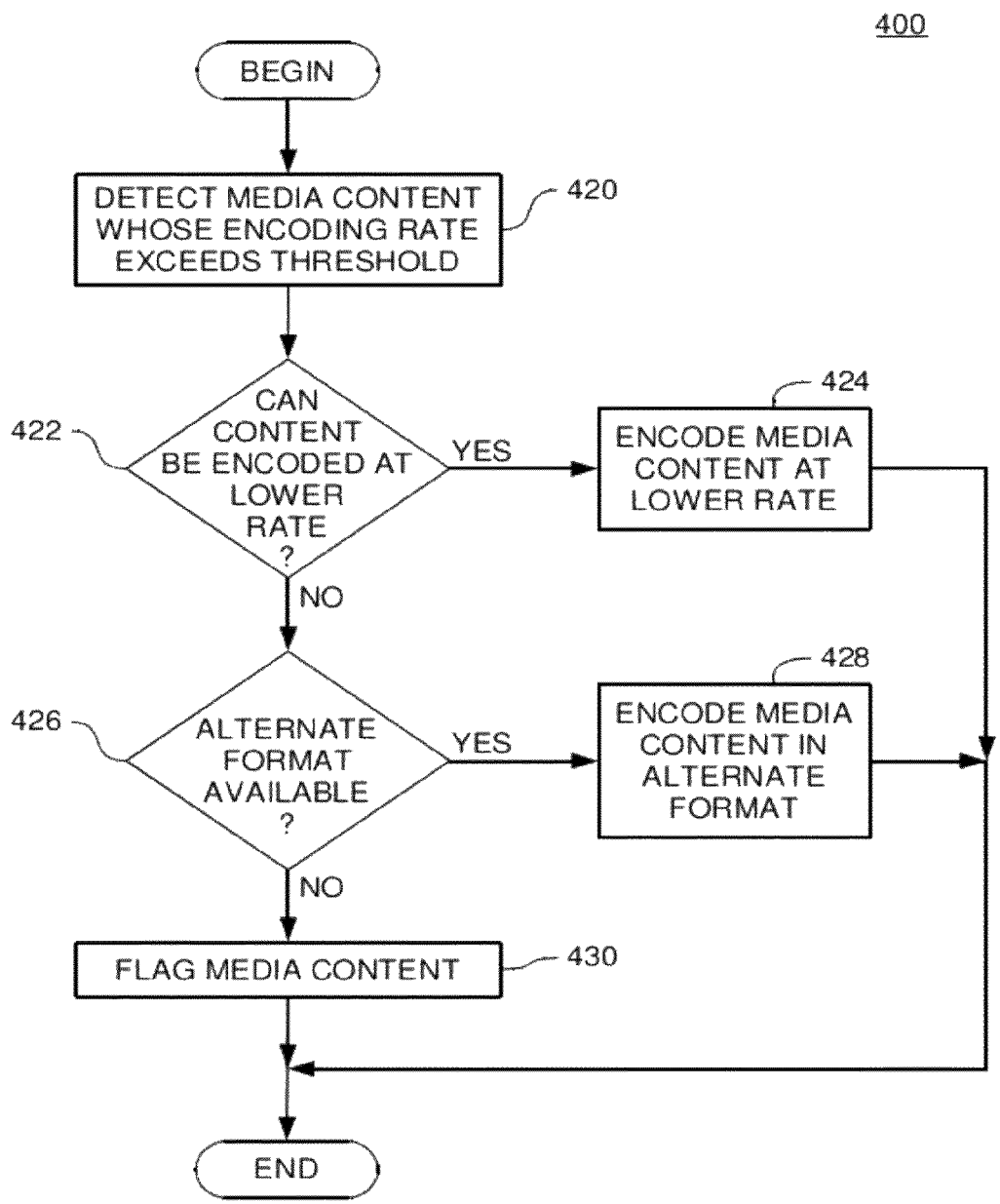
FIG. 4 is a flow diagram illustrating a method for optimizing media content in a database, according to one embodiment of the present invention.

FIG. 4 is a flow diagram illustrating a method for optimizing media content in a database, according to one embodiment of the present invention. As shown, the method 400 begins at step 420, where the media optimization component 180 detects media content whose encoding rate exceeds a threshold rate (step 420). Upon detecting the media content, the media optimization component 180 determines whether the media content can be encoded at a lower encoding rate (step 422). The media optimization component 180 may make such a determination based at least in part on one or more quality conditions. Generally, a "quality condition" as used herein refers to a minimum threshold value for encoding content. For instance, for audio content, an exemplary quality threshold may be a minimum encoding rate of 128 kbit/s for encoding content in the MPEG-2 Audio Layer 3 (i.e., MP3) format. As discussed above, in some embodiments, other factors (e.g., a class or priority level of the media content) may require a higher encoding rate for the media content. The quality threshold, on the other hand, specifies a minimum quality level for optimization of the media content.

Another example of an exemplary quality threshold is a minimum resolution threshold for encoding media content. Thus, in an environment containing a plurality of image files, a user may specify a minimum resolution that the audio files may be encoded at. As such, embodiments of the invention enable users to customize the level of optimization for the media content in the database. By doing this, embodiments enable users to balance the need to preserve storage space and improve performance for their multimedia database, with the need to retain the quality of the media content stored therein. In another embodiment, a quality threshold includes a maximum percentage reduction that may be applied to media content during optimization. For instance, such a quality threshold may specify that the resolution of an image file may be reduced by no more than 15%. Such a percentage may be appropriate, for instance, in a multimedia database containing a wide variety of image resolutions. By allowing users to specify a maximum percentage reduction for optimization of the media content, embodiments may be used to optimize a wider variety of multimedia databases and content. Of course, the above examples of quality thresholds are for illustrative purposes only and without limitation, and other threshold values and quality requirements consistent with the spirit and scope of the disclosure may be used instead.

If the media optimization component 180 determines the media content can be encoded at the lower encoding rate while still satisfying any quality thresholds, the media optimization component 180 encodes the media content at the lower rate (step 424). If instead the media optimization component 180 determines the media content cannot be encoded at a lower rate, the media optimization component 180 determines whether an alternate format is available for the media content (step 426). If the media optimization component 180 determines an alternate format is available, the media optimization component 180 encodes the media content in the alternate format (step 428). If instead the media optimization component 180 determines that no alternate formats are available for the media content, the media optimization component 180 flags the media content to indicate that the media content could not be further optimized (step 430). Once the media optimization component 180 encodes the media content at a lower rate, encodes the media content in an alternate format or flags the media content, the method 400 ends.

Figure 5:
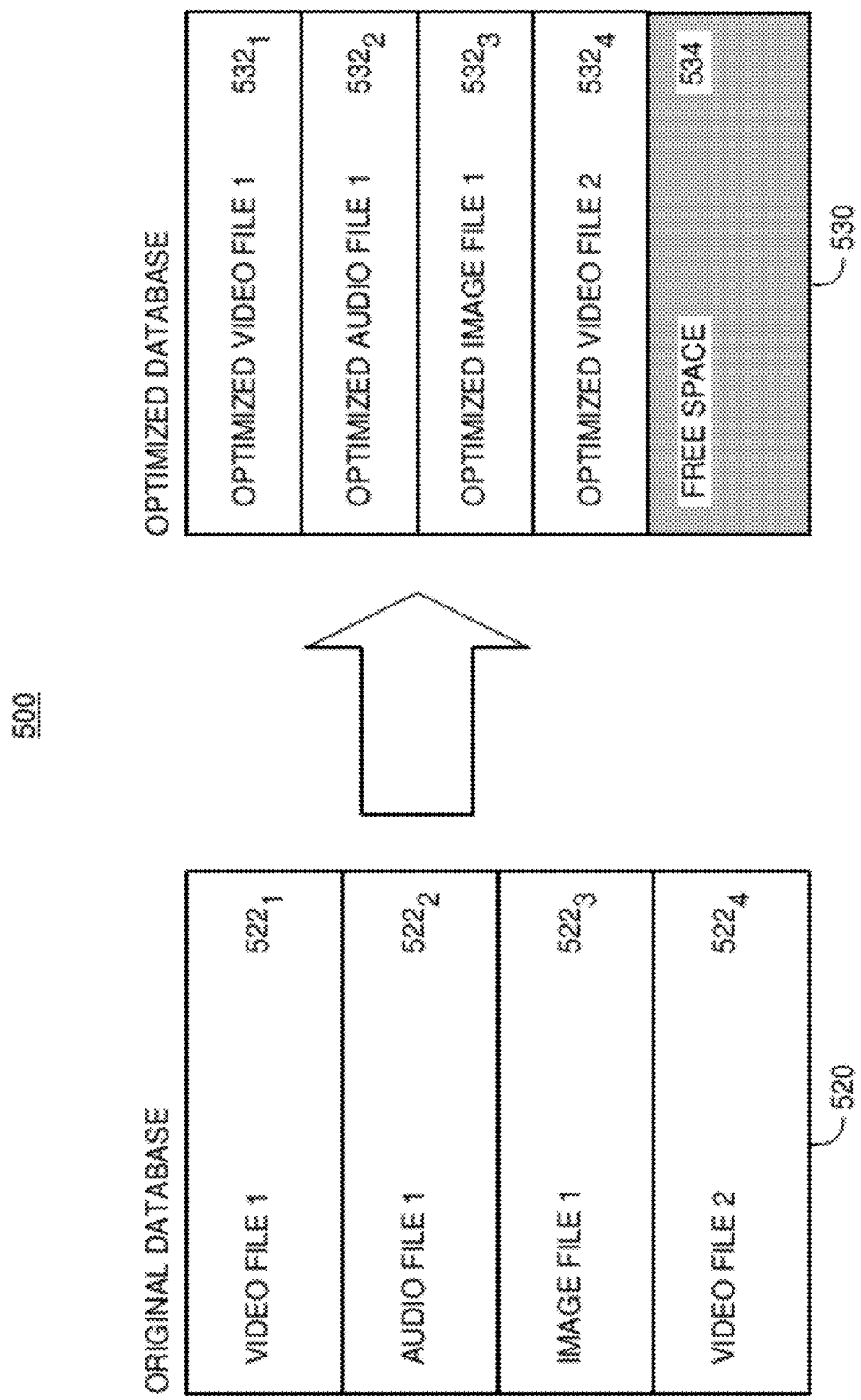
FIG. 5 is a diagram illustrating an un-optimized database and an optimized database, according to one embodiment of the present invention.

FIG. 5 is a diagram illustrating an un-optimized database and an optimized database, according to one embodiment of the present invention. As shown, the diagram 500 illustrates an original database 520 containing four instances of media content 522. In this particular example, the database 520 contains two video files $522_1$ and $522_4$, an audio file $522_2$ and an image file $522_3$. The diagram 500 also illustrates an optimized database 530. Similarly, the optimized database 530 also contains four instances of media content 532, each of which corresponds to a respective one of the original media content 522 in the original database 520. As such, the database 530 contains two optimized video files $532_1$ and $532_4$, an optimized audio file $532_2$ and an optimized image file $532_3$. Furthermore, the optimized database 530 also contains a portion of free space 534, which represents an amount of storage space conserved by optimized the media content in the database 530. As shown, by optimizing the media content 522 in the original database 520, embodiments of the invention may substantially reduce the size of the optimized database 530. Advantageously, such optimization enables more efficient storage of the media content 532, and further may increase the performance of the database and database system as a whole.

Figure 6B:
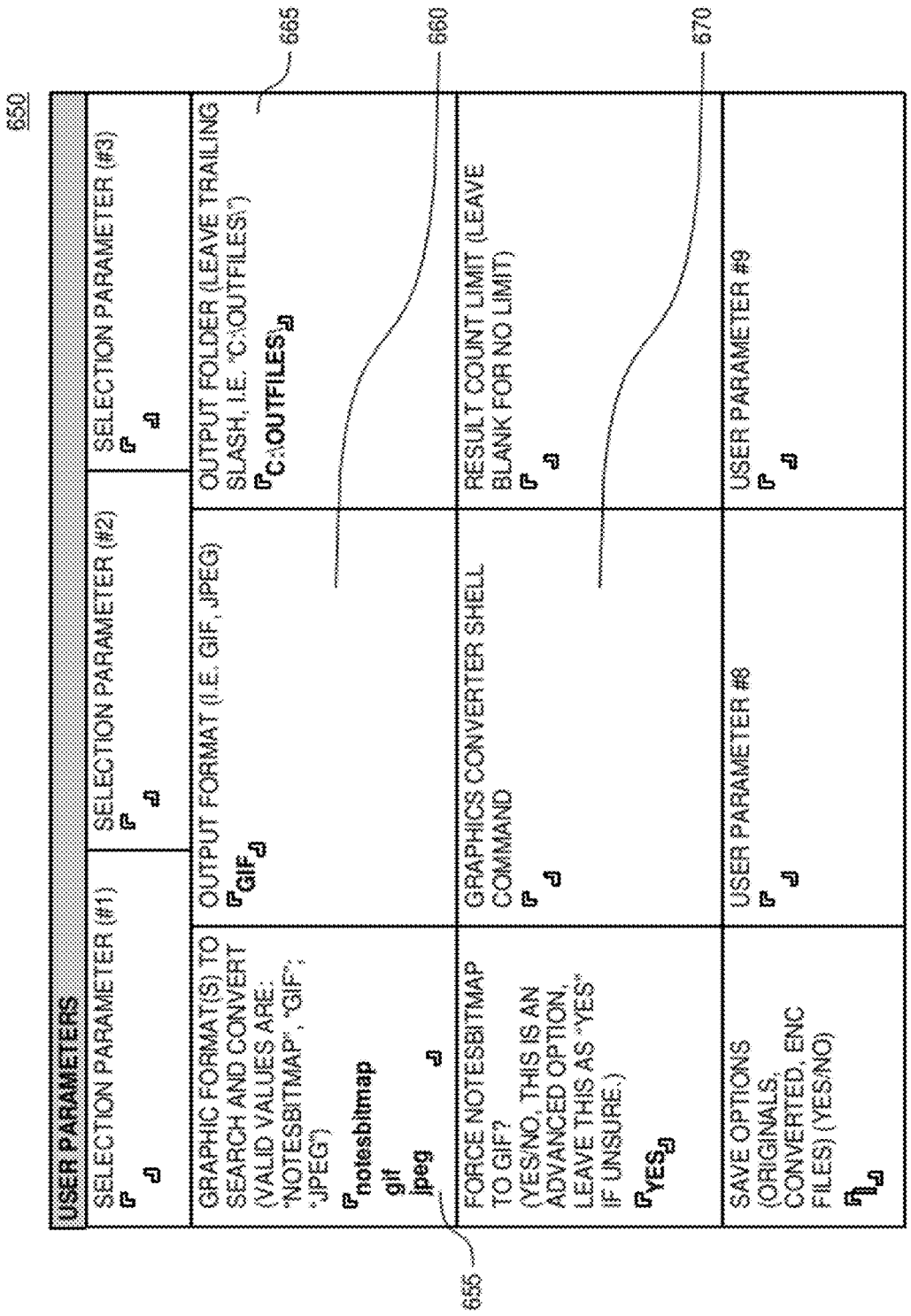

FIGS. 6A-6B are screenshots illustrating an exemplary configuration pages for the media optimization component, according to embodiments of the present invention. FIG. 6A is a screenshot of an exemplary configuration page for the media optimization component. As shown, the screenshot 600 includes a name for the optimization job 605, an operation to be performed 610, and a source of media content to be optimized 615. In the depicted embodiment, the operation 610 is "Document Graphic(s) Conversion," indicating that the image files within the source database 615 are to be optimized. The screenshot 600 further contains a notification list 620, which includes one or more parties to be notified regarding the status of the optimization. In the depicted example, the notification list 620 indicates that the user "Randy Oyarzabal" should be notified via email regarding the status of the optimization operations. Of course, any number of users may be included on such a notification list 620, and more generally, numerous other methods of notification may be used as well.

The screenshot further contains a schedule interval 625, which specifies how often the media optimization component 180 should perform the optimization. As shown, the schedule interval 625 is set to "Idle", indicating that the media optimization component 180 should scan and optimize the database whenever system resources on the computer system (e.g., multimedia database system 170) are idle. The screenshot further contains an optimization parameter 630, which in the depicted embodiment indicates that media content with a storage size greater than 300 MB should be optimized. Of course, such an example is for illustrative purposes and, as discussed above, numerous different optimization parameters and combination of optimization parameters may be used instead.

FIG. 6B is a screenshot illustrating an exemplary configuration page for the media optimization component. As shown, the screenshot 650 includes a listing of selection criteria 655 to search for, an output format 660 for optimized content, and an output folder 665 for storing any miscellaneous data used during optimization. In the depicted example, the media optimization component 180 is configured to search for all media content within a database that is stored in the format "notes-bitmap," "gif," or "jpeg." Although the selection criteria 655 are shown as specifying different file types for media content, numerous other types of selection criteria may be used. For example, in one embodiment, the selection criteria may specify a particular flag in the database that designates a particular database file as media content. Furthermore, the media optimization component 180 is configured to optimize the media content by converting it (if necessary) to the "gif" format.

Additionally, the screenshot 650 contains a graphics converter shell command 670 for specifying an external compression component. For example, in one embodiment, the user may specify a shell command to access the image compression component 230. In such an example, when the media optimization component 180 identifies an image file in the database to be optimized, the media optimization component 180 may use the specified shell command to instruct the image compression component 230 to optimize the identified image file. Advantageously, by doing this, embodiments of the invention enable the use of external compression components, creating a more modular design structure and allowing compression components to be more easily and efficiently used by the media optimization component 180.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for optimizing a data store, comprising:
   receiving a request containing (a) one or more optimization parameters specifying characteristics of media content to be optimized, the optimization parameters comprising at least one of (i) a threshold encoding rate, (ii) a threshold resolution, (iii) a threshold storage size, (iv) one or more disallowed media formats, (v) a priority level for media content to be optimized, and (vi) a class of media content, and (b) one or more selection criteria specifying types of media content to process;
   responsive to the request, searching the data store based on the one or more selection criteria to identify a plurality of media content contained in the data store that match the one or more selection criteria; and
   for each identified media content in the plurality of media content:
      determining whether to optimize the media content, based on one or more attributes of the media content, the one or more optimization parameters, and a minimum quality threshold for the media content comprising at least one of (i) a minimum resolution, (ii) a minimum encoding rate, and (iii) one or more acceptable encoding formats for the media content, and
      upon determining to optimize the media content, encoding, by operation of one or more computer processors, the media content in a media format to reduce a storage size of the media content, and in so doing so, optimizing the data store.

2. The computer-implemented method of claim 1, wherein the media content comprises at least one of audio content, video content and image content.

3. The computer-implemented method of claim 1, wherein encoding the media content further comprises converting the media content from a first media format to a second media format.

4. The computer-implemented method of claim 1, wherein the media content is originally encoded at a first encoding rate, and wherein encoding the media content further comprises encoding the media content at a second encoding rate, wherein the second encoding rate is a lower encoding rate relative to the first encoding rate.

5. The computer-implemented method of claim 1, wherein encoding the media content further comprises reducing a resolution of the media content.

6. The computer-implemented method of claim 1, wherein the attributes of the media content include at least one of (i) an encoding rate, (ii) a resolution, (iii) the storage size, (iv) a current media format, (v) a priority level, and (vi) a class.

7. A computer program product for optimizing a data store, comprising:
   a computer-readable storage medium having computer readable program code embodied therewith, the computer readable program code comprising:
      computer readable program code to receive a request containing (a) one or more optimization parameters and one or more selection criteria, wherein the optimization parameters specifying characteristics of media content to be optimized, the optimization parameters comprising at least one of (i) a threshold encoding rate, (ii) a threshold resolution, (iii) a threshold storage size, (iv) one or more disallowed media formats, (v) a priority level for media content to be optimized, and (vi) a class of media content, and (b) one or more selection criteria wherein the selection criteria specifying types of media content to process;
      computer readable program code to, responsive to the request, search the data store based on the one or more selection criteria to identify a plurality of media content contained in the data store that match the one or more selection criteria; and
      computer readable program code to, for each identified media content in the plurality of media content:
         determining whether to optimize the media content, based on one or more attributes of the media content, the one or more optimization parameters, and a minimum quality threshold for the media content comprising at least one of (i) a minimum resolution, (ii) a minimum encoding rate, and (iii) one or more acceptable encoding formats for the media content, and
         upon determining to optimize the media content, encoding, by operation of one or more computer processors, the media content in a media format to reduce a storage size of the media content, and in so doing so, optimizing the data store, by operation of one or more computer processors.

8. The computer program product of claim 7, wherein the media content comprises at least one of audio content, video content and image content.

9. The computer program product of claim 7, wherein the computer readable program code to encode the media content further comprises computer readable program code to convert the media content from a first media format to a second media format.

10. The computer program product of claim 7, wherein the media content is originally encoded at a first encoding rate, and wherein the computer readable program code to encode the media content further comprises computer readable program code to encode the media content at a second encoding rate, wherein the second encoding rate is a lower encoding rate relative to the first encoding rate.

11. The computer program product of claim 7, wherein the computer readable program code to encode the media content further comprises computer readable program code to reduce a resolution of the media content.

12. The computer program product of claim 7, wherein the attributes of the media content include at least one of (i) an encoding rate, (ii) a resolution, (iii) the storage size, (iv) a current media format, (v) a priority level, and (vi) a class.

13. A system, comprising:
a computer processor; and
a memory containing a program that, when executed on the computer processor, performs an operation for optimizing a data store, comprising:
receiving a request containing (a) one or more optimization parameters and one or more selection criteria, wherein the optimization parameters specifying characteristics of media content to be optimized, the optimization parameters comprising at least one of (i) a threshold encoding rate, (ii) a threshold resolution, (iii) a threshold storage size, (iv) one or more disallowed media formats, (v) a priority level for media content to be optimized, and (vi) a class of media content, and (b) one or more selection criteria wherein the selection criteria specifying types of media content to process;
responsive to the request, searching the data store based on the one or more selection criteria to identify a plurality of media content contained in the data store that match the one or more selection criteria; and
for each identified media content in the plurality of media content:
determining whether to optimize the media content, based on one or more attributes of the media content, the one or more optimization parameters, and a minimum quality threshold for the media content comprising at least one of (i) a minimum resolution, (ii) a minimum encoding rate, and (iii) one or more acceptable encoding formats for the media content, and
upon determining to optimize the media content, encoding, by operation of one or more computer processors, the media content in a media format to reduce a storage size of the media content, and in so doing so, optimizing the data store, by operation of one or more computer processors.

14. The system of claim 13, wherein encoding the media content further comprises converting the media content from a first media format to a second media format.

15. The system of claim 13, wherein the media content is originally encoded at a first encoding rate, and wherein encoding the media content further comprises encoding the media content at a second encoding rate, wherein the second encoding rate is a lower encoding rate relative to the first encoding rate.

16. The system of claim 13, wherein the attributes of the media content include at least one of (i) an encoding rate, (ii) a resolution, (iii) the storage size, (iv) a current media format, (v) a priority level, and (vi) a class.

* * * * *